(12) United States Patent
Sekoguchi et al.

(10) Patent No.: US 7,647,958 B2
(45) Date of Patent: Jan. 19, 2010

(54) PNEUMATIC TIRE WITH TREAD HAVING INCLINATION GROOVES

(75) Inventors: Masaharu Sekoguchi, Hiratsuka (JP); Shinichi Mori, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/265,345

(22) Filed: Nov. 5, 2008

(65) Prior Publication Data

US 2009/0218021 A1 Sep. 3, 2009

(30) Foreign Application Priority Data

Feb. 29, 2008 (JP) ............................. 2008-049436

(51) Int. Cl.
*B60C 11/11* (2006.01)
*B60C 11/12* (2006.01)
*B60C 11/13* (2006.01)

(52) U.S. Cl. .............................. 152/209.2; 152/209.18; 152/209.22; 152/209.24; 152/209.28; 152/DIG. 3

(58) Field of Classification Search .............. 152/209.2, 152/209.3, 209.11, 209.18, 209.21, 209.22, 152/209.24, 209.28, DIG. 3, 902

See application file for complete search history.

(56) References Cited

U.S. PATENT DOCUMENTS

| | | | | |
|---|---|---|---|---|
| 4,962,801 A | * | 10/1990 | Tsuda | 152/209.28 |
| 5,370,168 A | * | 12/1994 | Boiocchi et al. | 152/209.28 |
| 5,375,639 A | * | 12/1994 | Suzuki et al. | 152/209.28 |
| 6,691,753 B2 | * | 2/2004 | Hanebuth et al. | 152/209.28 |
| 2003/0111151 A1 | * | 6/2003 | Masaki | 152/209.28 |
| 2006/0060278 A1 | * | 3/2006 | Noguchi et al. | 152/209.18 |

FOREIGN PATENT DOCUMENTS

| | | | |
|---|---|---|---|
| EP | 739758 | * | 10/1996 |
| GB | 738143 | * | 10/1955 |
| JP | 03-032907 | * | 2/1991 |
| JP | 3-82610 | | 4/1991 |
| JP | 06-106916 | * | 4/1994 |

(Continued)

*Primary Examiner*—Steven D Maki
(74) *Attorney, Agent, or Firm*—Greer, Burns & Crain, Ltd.

(57) ABSTRACT

A pneumatic tire having a rotation direction specified in one direction. The tread surface has a main groove extending on the equatorial plane of the tire, right and left first inclination grooves extending in an inclined manner from the main groove toward the reverse rotation direction of the tire, and right and left second inclination grooves disposed on the opposite sides of the main groove. The right and left second inclination grooves are disposed at symmetrical positions with respect to the equatorial plane of the tire. Blocks are formed on the opposite sides of the main groove by the main groove, right and left first inclination grooves and right and left second inclination grooves. The blocks include right and left first blocks defined by tire rotation direction side portions of the second inclination grooves, main groove and first inclination grooves, and right and left second blocks defined by tire reverse rotation direction side portions of the second inclination grooves, main groove and first inclination grooves. First main groove portions between the right and left first blocks are less in width than second main groove portions between the right and left second blocks.

12 Claims, 2 Drawing Sheets

FOREIGN PATENT DOCUMENTS

| | | | |
|---|---|---|---|
| JP | 07-215013 | * | 8/1995 |
| JP | 11-342707 | | 12/1999 |
| JP | 2002-059711 | * | 2/2002 |
| JP | 2003-146017 | * | 5/2003 |
| JP | A 2003-175705 | | 6/2003 |
| JP | 2006-82734 | | 3/2006 |
| WO | WO 95/18022 | * | 7/1995 |

* cited by examiner

PNEUMATIC TIRE WITH TREAD HAVING INCLINATION GROOVES

BACKGROUND OF THE INVENTION

The present invention relates to pneumatic tires, and more particularly, to a pneumatic tire which can improve dry performance on a half dried road surface while maintaining high wet performance.

As one of pneumatic tires preferably used for racing cart tires which require high drainage characteristics when running straight and cornering on a rainy day, there has conventionally been known a pneumatic tire having a tread pattern in which a main groove extending in the circumferential direction of the tire is provided on the equatorial plane of the tire and two types of inclination grooves are adequately disposed on the opposite sides of the main groove (see Japanese Patent Application Kokai Publication 2003-175705, for example).

A racing course for the carts includes half dried road surface sections having wet road surface conditions without water, and wet road surface sections having water thereon when running on a rainy day. When the carts run thereon, the carts may run also on the half dried road surface sections. In this case, the above pneumatic tire providing high wet performance by the main groove and inclination grooves must degrade dry performance (driving stability) on the half dried road surface sections which conflicts with wet performance, requiring improvement thereof.

SUMMARY OF THE INVENTION

An object of the present invention is to provide a pneumatic tire capable of improving dry performance on a half dried road surface while maintaining high wet performance.

In order to achieve the above object, the present invention provides a pneumatic tire having a rotation direction specified in one direction and a tread surface, a main groove extending in a circumferential direction of the tire being provided on an equatorial plane of the tire in the tread surface, right and left first inclination grooves being disposed at prescribed intervals in the circumferential direction of the tire, the right and left first inclination grooves extending from the main groove toward opposite sides of the tire in a widthwise direction of the tire beyond ground contact ends of the tire in an inclined manner toward a reverse rotation direction of the tire, right and left second inclination grooves being provided on opposite sides of the main groove at prescribed intervals in the circumferential direction of the tire, the right and left second inclination grooves extending across the right and left first inclination grooves in such an inclined manner with respect to the circumferential direction of the tire that tire reverse rotation direction sides of the second inclination grooves are more away from the main groove than tire rotation direction sides of the second inclination grooves, blocks being defined on the opposite sides of the main groove by the main groove, right and left first inclination grooves and right and left second inclination grooves, wherein: the right and left second inclination grooves are disposed at symmetrical positions with respect to the equatorial plane of the tire; the blocks comprise right and left first blocks defined by tire rotation direction side portions of the right and left second inclination grooves, main groove and right and left first inclination grooves, and right and left second blocks defined by tire reverse rotation direction side portions of the right and left second inclination grooves, main groove and right and left first inclination grooves, the first blocks each having a circumferential length LA, the second blocks each having a circumferential length LB, the circumferential length LB being greater than the circumferential length LA; and the main groove has first main groove portions between the right and left first blocks and second main groove portions between the right and left second blocks, widths of the first main groove portions being less than widths of the second main groove portions.

According to the present invention mentioned above, by narrowing the widths of the first main groove portions between the first blocks, the first blocks are larger in the widthwise direction, enabling stiffness thereof to be enhanced. Therefore, driving stability during running on a half dried road surface can be raised, enabling improvement of dry performance on a half dried road surface.

On the other hand, by disposing the right and left second inclination grooves at symmetrical positions, water can be expelled evenly sideways during running on a wet road surface. Therefore, the tire has a drainage effect higher than one having second inclination grooves offset in the circumferential direction of the tire. As a result, the arrangement of the second inclination grooves compensates for a decrease in drainage characteristics arising from narrowing of the widths of the first main groove portions, which can suppress reduction of drainage characteristics. Accordingly, wet performance as high as that of the prior art can be obtained.

DETAILED DESCRIPTION OF THE PREFERRED EMBODIMENT

An embodiment of the present invention will be described in detail below with reference to the attached drawings.

Figure 1:
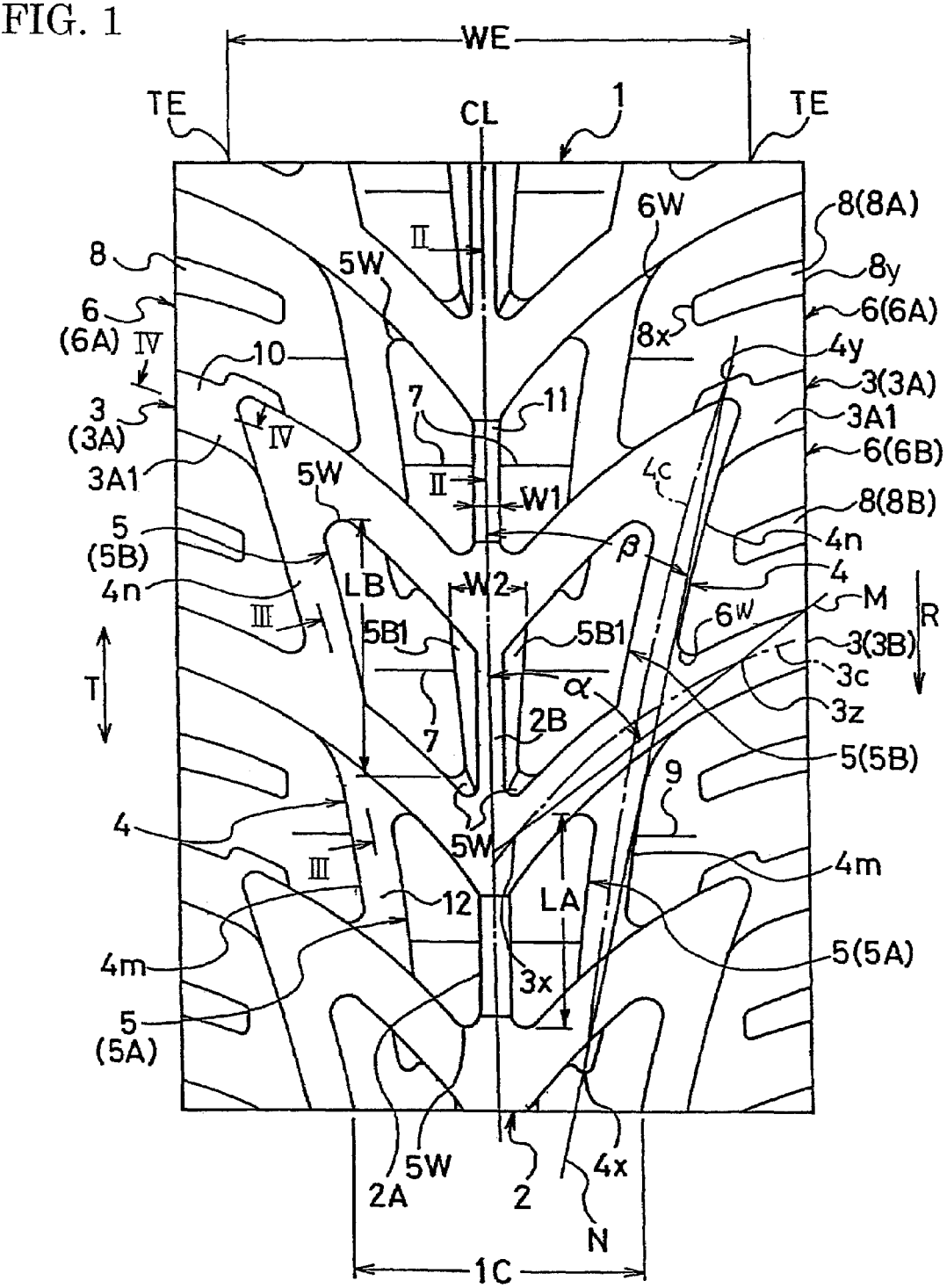
FIG. 1 is a partial development view of a tread surface showing an embodiment of a pneumatic tire according to the present invention.

Referring to FIG. 1, there is shown a main part of a pneumatic tire according to the present invention; reference numeral 1 denotes a tread surface. The pneumatic tire has a rotation direction specified in one direction shown by arrow R. A main groove 2 extending straight in the circumferential direction T of the tire is provided on the equatorial plane CL of the tire in the tread surface 1. Right and left first inclination grooves 3, which extend from the main groove 2 toward the opposite sides of the tire in the widthwise direction of the tire in an inclined manner toward the reverse rotation direction of the tire, are disposed at prescribed intervals in the circumferential direction T of the tire. The right and left first inclination grooves 3 extend in a circularly curved manner beyond right and left ground contact ends TE of the tire on the tread surface 1, and are disposed at symmetrical positions with respect to the equatorial plane CL of the tire. The first inclination grooves 3 may extend in a straight manner instead of the circularly curved manner.

Right and left second inclination grooves 4, which extend in an inclined manner with respect to the circumferential direction T of the tire, are provided on the opposite sides of the main groove 2 at prescribed intervals in the circumferential direction T of the tire. The second inclination grooves 4 extend to the ground contact ends TE of the tire in a circularly curved manner. Each second inclination groove 4 has a tire rotation direction side and a tire reverse rotation direction side which is more away from the main groove 2 than the tire rotation direction side, and has an inclination angle with respect to the circumferential direction T of the tire which gradually increases toward the tire reverse rotation direction side. The second inclination groove 4 extends across three first inclination grooves 3. The second inclination grooves 4, like the first inclination grooves 3, may extend in a straight manner instead of the circularly curved manner.

A plurality of blocks 5 are defined by the main groove 2, right and left first inclination grooves 3, and right and left second inclination grooves 4 on the opposite sides of the main groove 2 in the tread surface 1. Also, a plurality of blocks 6 are defined by the right and left first inclination grooves 3 and right and left second inclination grooves 4 on the opposite shoulder sides of the tread surface 1.

The right and left second inclination grooves 4 are disposed at symmetrical positions with respect to the equatorial plane CL of the tire, and have tire rotation direction side terminal ends 4x located in alternate blocks 5 (second blocks 5B) in the circumferential direction T of the tire and tire reverse rotation direction side terminal ends 4y located in alternate blocks 6 (first blocks 6A) in the circumferential direction T of the tire. The second inclination grooves 4 have tire rotation direction side portions 4m and tire reverse rotation direction side portions 4n, respectively.

The blocks 5 comprise right and left first blocks 5A defined by the tire rotation direction side portions 4m of the right and left second inclination grooves 4, main groove 2 and right and left first inclination grooves 3, and right and left second blocks 5B defined by the tire reverse rotation direction side portions 4n of the right and left second inclination grooves 4, main groove 2 and right and left first inclination grooves 3. The right and left first blocks 5A and right and left second blocks 5B are alternately disposed in the circumferential direction T of the tire, respectively.

Each first block 5A has a circumferential length LA measured along the circumferential direction T of the tire, and each second block 5B has a circumferential length LB measured along the circumferential direction T of the tire. The circumferential length LB of the second block 5B is greater than the circumferential length LA of the first block 5A. The second block 5B is greater also in width than the first block 5A. The first block 5A and second block 5B are each substantially in the form of a parallelogram in plan view and have obtuse-angled corners and acute-angled corners. Each of the acute-angled corners has a wall surface 5W which is circularly chamfered in cross section. Each block 5 has a tread surface section, where one sipe 7 extending straight along the widthwise direction of the tire is provided in its central region in the circumferential direction of the tire.

The blocks 6 on each shoulder side comprise first blocks 6A which are adjacent to the first blocks 5A via the tire rotation direction side portions 4m of the second inclination grooves 4 and in which the tire reverse rotation direction side terminal ends 4y of the second inclination grooves 4 are located, and second blocks 6B adjacent to the second blocks 5B via the tire reverse rotation direction side portions 4n of the second inclination grooves 4. The first blocks 6A and second blocks 6B are alternately disposed in the circumferential direction T of the tire. The first blocks 6A and second blocks 6B have acute-angled corners and obtuse-angled corners facing the second inclination grooves 4. The acute-angled corners and obtuse-angled corners have wall surfaces 6W circularly chamfered in cross section. The first blocks 6A are greater in width than the second blocks 6B.

Each block 6 has a tread surface section, where one subsidiary groove 8 extending in the widthwise direction of the tire is provided in its center in the circumferential direction of the tire. The subsidiary groove 8 extends in an inclined manner like the first inclination grooves 3 so that its inner terminal end 8x is away from a second inclination groove 4 adjacent thereto and its outer terminal end 8y is located on a design end of the tread surface 1. The subsidiary groove 8A disposed in the first block 6A extends longer inward in the widthwise direction of the tire than the subsidiary groove 8B disposed in the second block 6B. The subsidiary groove 8 is placed such that it does not communicate with the second inclination groove 4 as described above, whereby drainage characteristics are enhanced while a decrease in stiffness of the block 6 is suppressed. Each first block 6A has a tread surface section, where one sipe 9 extending straight from a second inclination groove 4 adjacent thereto outward in the widthwise direction of the tire is provided.

The main groove 2 has first main groove portions 2A between the right and left first blocks 5A, and second main groove portions 2B between the right and left second blocks 5B. The first main groove portions 2A are each less in width than the second main groove portions 2B at a location of the tread surface 1. The first main groove portions 2A have the same widths as the second main groove portions 2B at the bottom of the main groove 2. The second main groove portions 2B each have a width which gradually increases toward the reverse rotation direction of the tire at the location of the tread surface 1. The right and left second blocks 5B each have a wall surface 5B1 beside the main groove 2. The wall surface 5B1 is inclined to the equatorial plane CL of the tire in cross section taken in a plane that contains the axis of rotation of the tire, and its inclination angle with respect to the equatorial plane CL of the tire gradually increases toward the reverse rotation direction of the tire.

According to the present invention described above, the widths of the first main groove portions 2A between the first blocks 5A are narrowed, whereby the first blocks 5A are larger in the widthwise direction, enabling stiffness thereof to be enhanced. Therefore, driving stability during running on a half dried road surface can be raised, enabling improvement of dry performance on a half dried road surface. If the widths of the second main groove portions 2B are narrowed to enhance stiffness of the second blocks 5B, differences in stiffness between the first blocks 5A and second blocks 5B are greater, creating a problem of uneven wear.

On the other hand, the right and left second inclination grooves 4 are disposed at symmetrical positions with respect to the equatorial plane CL of the tire, whereby water can be expelled evenly sideways. Therefore, the tire has a drainage effect higher than one having second inclination grooves 4 offset in the circumferential direction of the tire. As a result, the symmetrically disposed second inclination grooves 4 compensate for a decrease in drainage characteristics arising from narrowing of the widths of the first main groove portions 2A, which can suppress reduction of drainage characteristics. Accordingly, wet performance as high as that of the prior art can be obtained.

By gradually increasing the widths of the second main groove portions 2B toward the reverse rotation direction of the tire, a drainage effect arising from the second main groove portions 2B can be enhanced. On the other hand, by gradually increasing the inclination angles, with respect to the equatorial plane CL of the tire, of the wall surfaces 5B1 of the right and left second blocks 5B facing the gradually widening second main groove portions 2B toward the reverse rotation direction of the tire, stiffness of the second blocks 5B does not decrease when the widths of the second main groove portions 2B is gradually increased to thereby reduce the widths of the second blocks 5B.

When the tire is used for a front tire, heat generation of the first blocks 5A is suppressed, and movements of the first blocks 5A can be less than before. Therefore, handle operability during running on a half dried road surface can be raised, enabling further improvement of dry performance on a half dried road surface.

In the present invention, the widths of the first main groove portions 2A and second main groove portions 2B are preferably arranged such that the ratio W2/W1 of the maximum width W2 of each second main groove portion 2B to the minimum width W1 of each first main groove portion 2A is in the range of 2.5 to 4.5. If the ratio W2/W1 is under 2.5, reduction of wet performance and uneven wear are apt to occur. If the ratio W2/W1 is beyond 4.5, driving stability on a half dried road surface is deteriorated. Note that the first main groove portions 2A shown in FIG. 1 are constant in width, but the widths of the first main groove portions 2A may be varied.

The width of each second main groove portion 2B is preferably in the range of 6% to 11% of a ground contact width WE of the tire on the tread surface 1. If the width of the second main groove portion 2B is less than 6% of the ground contact width WE of the tire, drainage characteristics are degraded. If the width of the second main groove portion 2B is greater than 11% of the ground contact width WE of the tire, stiffness of the second blocks 5B is lowered, whereby driving stability during running on a half dried road surface can not be improved.

The ratio LB/LA of the circumferential length LB of the second block 5B to the circumferential length LA of the first block 5A is preferably in the range of 1.1 to 1.9. If the ratio LB/LA is less than 1.1, stiffness of the second block 5B is lowered, whereby it is difficult to improve driving stability during running on a half dried road surface. If the ratio LB/LA is greater than 1.9, a stiffness difference between the blocks 5A and 5B is so great that uneven wear is apt to occur.

Each of the first inclination grooves 3 has an inclination angle α with respect to the circumferential direction T of the tire, and the inclination angle α is preferably in the range of 40° to 60°. If the inclination angle α is under 40°, drainage characteristics are degraded. If the inclination angle α exceeds 60°, block stiffness is lowered, whereby driving stability during running on a half dried road surface is degraded. When the first inclination groove 3 extends in a circularly curved manner as shown in FIG. 1, the inclination angle α is an inclination angle, with respect to the circumferential direction T of the tire, of a straight line M passing an inner terminal end 3x of the first inclination groove 3 and a position 3z on the ground contact end TE of the tire which are located on the center line 3c of the first inclination groove 3.

Each of the second inclination groove 4 has an inclination angle β with respect to the circumferential direction T of the tire, and the inclination angle β is preferably in the range of 10° to 30°. If the inclination angle β is under 10°, drainage characteristics are degraded when cornering. If the inclination angle β is beyond 30°, drainage characteristics are deteriorated when running straight. When the second inclination groove 4 extends in a circularly curved manner as shown in FIG. 1, the inclination angle β is an inclination angle, with respect to the circumferential direction T of the tire, of a straight line N passing opposite terminal ends 4x and 4y of the second inclination groove 4 which are located on the center line 4c of the second inclination groove 4.

The tread surface 1 has a center region 1C between positions away right and left from the equatorial plane CL of the tire by a distance of 55/2% of the ground contact width WE of the tire. The center region 1C has a groove area percentage, which is preferably in the range of 50% to 60%. If the groove area percentage is under 50%, drainage characteristics are degraded. If the groove area percentage is beyond 60%, block stiffness is lowered, whereby it is difficult to improve driving stability during running on a half dried road surface.

Figure 2:
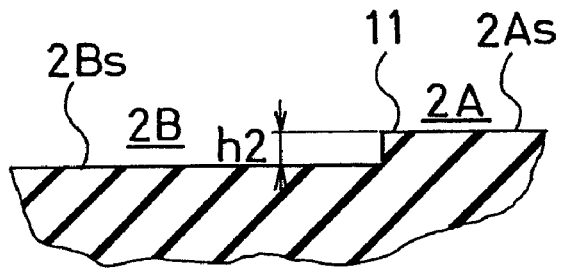
FIG. 2 is an enlarged cross-sectional view of the bottom of a main groove taken along line II-II of FIG. 1.
Figure 3:
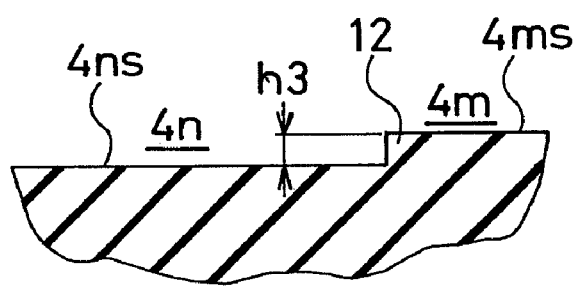
FIG. 3 is an enlarged cross-sectional view of the bottom of a second inclination groove taken along line III-III of FIG. 1.

When the pneumatic tire described above is used for a front tire of a racing cart or the like, it is preferable that block stiffness be higher. In this case, as shown in FIG. 2, a bottom-raising portion 11 is preferably provided in each first main groove portion 2A in such a manner that the first main groove portion 2A having a bottom 2As is less in depth than the second main groove portion 2B having a bottom 2Bs, thereby connecting two first blocks 5A standing on the opposite sides of the main groove 2 by the bottom-raising portion 11. Also, as shown in FIG. 3, a bottom-raising portion 12 is preferably provided in each second inclination groove 4 in such a manner that the tire rotation direction side portion 4m of the second inclination groove 4 having a bottom 4ms is less in depth than the tire reverse rotation direction side portion 4n of the second inclination groove 4 having a bottom 4ns, thereby connecting a first blocks 5A and a first block 6A standing in the widthwise direction of the tire by the bottom-raising portion 12. This allows stiffness of the first block 5A to be further enhanced, enabling movement thereof to be suppressed. As a result, handle operability during running on a half dried road surface can be further raised.

Figure 4:
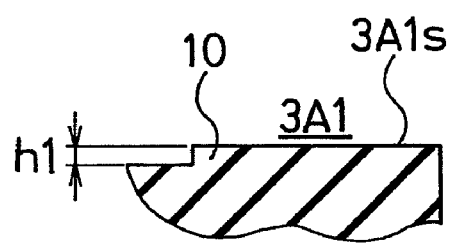
FIG. 4 is an enlarged cross-sectional view of the bottom of a first inclination groove taken along line IV-IV of FIG. 1.

In the case where driving stability during running on a half dried road surface is further improved, as shown in FIGS. 1 and 4, the first inclination grooves 3 are preferably arranged such that every other first inclination groove in the circumferential direction T of the tire is partially less in depth on the shoulder side of the tire. In FIG. 1, the every other first inclination groove is a first inclination groove 3A between a first block 6A and a second block 6B adjacent thereto in the rotation direction of the tire. The first inclination groove 3A has a groove portion 3A1 located outward in the widthwise direction of the tire from the ground contact end TE of the tire. A bottom-raising portion 10 is provided in the groove portion 3A1 in such a manner that the groove portion 3A having a bottom 3A1 is less in depth than the other groove portion of the first inclination groove 3A having a bottom. The bottom-raising portion 10 is located outward, in the widthwise direction of the tire, of an inclination groove 4 crossing to the first inclination groove 3A. The two blocks 6A and 6B adjacent in the circumferential direction T of the tire are connected by the bottom-raising portion 10, thereby allowing stiffness of the blocks 6A and 6B to be increased. This enables block stiffness in the shoulder regions of the tread surface 1 to be increased, whereby driving stability during running on a half dried road surface can be enhanced. The bottom-raising portion 10 may be provided in the other first inclination groove 3B instead of the first inclination groove 3A.

The bottom-raising portion 10 has a height h1, the bottom-raising portion 11 has a height h2, and the bottom-raising portion 12 has a height h3. It is preferable in terms of an effective increase in block stiffness without noticeable deterioration of drainage characteristics that the height h1 be in the range of 30% to 70% of the depth of the first inclination groove 3A from the bottom thereof, the height h2 be in the range of 30% to 70% of the depth of the main groove 2 from the bottom thereof, and the height h3 be in the range of 30% to 70% of the depth of the second inclination groove 4 from the bottom thereof. The depths of the main groove 2, first inclination grooves 3 and second inclination grooves 4 can be in the range of 4 mm to 8.5 mm, respectively.

In the embodiment described above, each second inclination groove 4 is provided so as to extend across three first inclination grooves 3. However, the second inclination groove 4 may be disposed so as to extend across more than three first inclination grooves 3. The upper limit of the number of the first inclination grooves 3 that the second inclination groove 4 goes across is preferably eight at a maximum from the viewpoint of block stiffness although it is different in tire size.

The present invention is preferably applicable to tires for racing carts in particular requiring high wet performance when running on a rainy day; however, the present invention is also suitable for application to pneumatic tires used for other vehicles as a matter of course.

It should be noted that the tire ground contact width WE and the tire ground contact ends TE referred in the present invention are a maximum ground contact width of the tread surface 1 and ground contact ends thereof when measured under such conditions that, when the tire is used for racing carts and has a tire size of 4.5×10.0-5, it is mounted on a rim having a service rim width of 4.5 inches and inflated to an air pressure of 100 kPa, and a load of 0.45 kN is applied thereto, and that, when the tire is used for racing carts and has a tire size of 6.0×11.0-5, it is mounted on a rim having a service rim width of 6.5 inches and inflated to an air pressure of 100 kPa, and a load of 0.65 kN is applied thereto. When the tire is a tire other than the tire for racing carts, the tire ground contact width WE and the tire ground contact ends TE referred in the present invention are a maximum ground contact width of the tread surface 1 and ground contact ends thereof when measured under such conditions that the tire is mounted on a standard rim specified by JATMA (Japanese Automobile tire manufacturer association) and inflated to an air pressure corresponding to the maximum load capacity specified by JATMA, and a load equivalent to 75% of the maximum load capacity is applied thereto.

EXAMPLE

Prepared respectively were test tires according to the present invention tires 1 and 2 (present examples 1 and 2) and control tire (control example), each used for a front tire having a tire size of 4.5×10.0-5, each used for a rear tire having a tire size of 6.0×11.0-5, the present invention tire 1 having a structure shown in FIG. 1, the present invention tire 2 having the same structure as the present invention tire 1 except that there was no bottom-raising portion on the bottoms of the main groove, first inclination grooves and second inclination grooves, the control tire having the same structure as the present invention tire 2 except that the right and left second inclination grooves were disposed in positions offset in the circumferential direction of the tire and the main groove was constant in width.

In each of the present invention tires 1 and 2, the ratio W2/W1 of the maximum width W2 of each second main groove portion to the minimum width W1 of each first main groove portion is 3.5, the ratio LB/LA of the circumferential length LB of each second block to the circumferential length LA of each first block is 1.5, the inclination angle α of each first inclination groove with respect to the circumferential direction of the tire is 50°, and the inclination angle β of each second inclination groove with respect to the circumferential direction of the tire is 20°. The width of each second main groove portion gradually increases in the range of 6% to 11% of the tire ground contact width WE. The groove area percentage of the center region is 55%.

In each of the present invention tires 1 and 2, the depths of the main groove, first inclination grooves and second inclination grooves are 6 mm, respectively. In the present invention tire 1, the depths of parts of the main groove, first inclination grooves and second inclination grooves in which bottom-raising portions are provided to reduce their depths are 3 mm, respectively. In the control tire, the depth of the main groove is 8.5% of the tire ground contact width WE, and the groove area percentage of the center region is 55%.

The respective test tires were assembled to rims corresponding thereto, inflated to an air pressure of 100 kPa, and mounted on a vehicle (racing cart) of 125 cc displacement. Evaluation testing for wet performance, and driving stability and handle operability on a half dried road surface was carried out according to the testing methods shown below, obtaining the results shown in Table 1.

Wet Performance

The car was run on a wet road test course having a water depth of 2 mm to 3 mm, and feeling testing for driving stability was conducted by a test driver. The evaluation result thereof is represented by an index where the control tire is 100. As the index is greater, wet performance is better. Note that the index range of 98 to 102 is a range equivalent to the prior art level.

Driving Stability and Handle Operability on Half Dried Road Surface

The car was run on a test course having half dried conditions, and feeling testing for driving stability and handle operability was conducted by a test driver. The evaluation results thereof are respectively represented by an index where the control tire is 100. As the index is greater, each performance is better.

TABLE 1

|  |  | Presnet Example 1 | Presnet Example 2 | Control Example |
|---|---|---|---|---|
| Wet Performance |  | 98 | 105 | 100 |
| Half Dried | Driving Stability | 110 | 105 | 100 |
| Road Surface | Handle Operability | 115 | 105 | 100 |

From Table 1, it is understood that the present invention tires can improve dry performance on a half dried road surface while maintaining wet performance at the same level as the prior art.

What is claimed is:

1. A pneumatic tire comprising a tread surface having a specified tire rotation direction, a main groove extending in a circumferential direction of the tire being provided on an equatorial plane of the tire in the tread surface, right and left first inclination grooves being disposed at prescribed intervals in the circumferential direction of the tire, the right and left first inclination grooves extending from the main groove toward opposite sides of the tire in a widthwise direction of the tire beyond ground contact ends of the tire in an inclined manner toward a reverse rotation direction of the tire, right and left second inclination grooves being provided on opposite sides of the main groove at prescribed intervals in the circumferential direction of the tire, the right and left second inclination grooves extending across the right and left first inclination grooves in such an inclined manner with respect to the circumferential direction of the tire that tire reverse rotation direction sides of the second inclination grooves are more away from the main groove than tire rotation direction sides of the second inclination grooves, blocks being defined on the opposite sides of the main groove by the main groove, right and left first inclination grooves and right and left second inclination grooves, wherein:

the right and left second inclination grooves are disposed at symmetrical positions with respect to the equatorial plane of the tire;

the blocks comprise right and left first blocks defined by tire rotation direction side portions of the right and left second inclination grooves, main groove and right and left first inclination grooves, and right and left second blocks defined by tire reverse rotation direction side portions of the right and left second inclination grooves, main groove and right and left first inclination grooves, the first blocks each having a circumferential length LA, the second blocks each having a circumferential length LB, the circumferential length LB being greater than the circumferential length LA; and the main groove has first main groove portions between the right and left first blocks and second main groove portions between the right and left second blocks, widths of the first main groove portions between a first corner of a right first block and a first corner of a left first block being less than widths of the second main groove portions between a second corner of a right second block and a second corner of a left second block, wherein the first corners of the first blocks are located at the tire reverse rotation direction side of the first blocks and the second corners of the second blocks are located at the tire reverse rotation direction side of the second blocks.

2. The pneumatic tire according to claim 1, wherein the widths of the second main groove portions gradually increase toward the reverse rotation direction of the tire.

3. The pneumatic tire according to claim 2, wherein the right and left second blocks each have a wall surface beside the main groove, the wall surface having an inclination angle with respect to a normal line of the tire, the inclination angle gradually increasing toward the reverse rotation direction of the tire.

4. The pneumatic tire according to claim 1, wherein a ratio W2/W1 of a maximum width W2 of each second main groove portion to a minimum width W1 of each first main groove portion is 2.5 to 4.5.

5. The pneumatic tire according to claim 1, wherein a ratio LB/LA of the circumferential length LB of the second block to the circumferential length LA of the first block is 1.1 to 1.9.

6. The pneumatic tire according to claim 1, wherein the first inclination grooves each have an inclination angle of 40° to 60° with respect to the circumferential direction of the tire, and wherein the second inclination grooves each have an inclination angle of 10° to 30° with respect to the circumferential direction of the tire.

7. The pneumatic tire according to claim 1, wherein each second inclination groove extends across three first inclination grooves, the second inclination groove having opposite terminal ends located within blocks.

8. The pneumatic tire according to claim 1, wherein the tread surface has a center region between positions away right and left from the equatorial plane of the tire by a distance of 55/2% of a ground contact width of the tire, the center region having a groove area percentage of 50% to 60%.

9. The pneumatic tire according to claim 1, wherein the first main groove portions are less in depth than the second main groove portions.

10. The pneumatic tire according to claim 1, wherein the tire rotation direction side portions of the second inclination grooves are less in depth than the tire reverse rotation direction side portions thereof.

11. The pneumatic tire according to claim 1, wherein every other first inclination groove in the circumferential direction of the tire is partially less in depth on a shoulder side of the tire, relative to a depth of the first inclination groove on a main groove side of the first inclination groove.

12. The pneumatic tire according to claim 1, wherein sipes extending in the widthwise direction of the tire are provided in each of the first blocks and second blocks.

* * * * *